United States Patent
Hong et al.

(10) Patent No.: US 9,547,891 B2
(45) Date of Patent: Jan. 17, 2017

(54) IMAGE PROCESSING METHOD, SYSTEM USING THE SAME, AND RECORDING MEDIUM FOR PERFORMING THE SAME

(71) Applicant: Foundation of Soongsil University-Industry Cooperation, Seoul (KR)

(72) Inventors: Mincheol Hong, Seoul (KR); Tuan anh Nguyen, Seoul (KR); Jonggeun Oh, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/904,429

(22) PCT Filed: May 30, 2014

(86) PCT No.: PCT/KR2014/004821
§ 371 (c)(1),
(2) Date: Jan. 11, 2016

(87) PCT Pub. No.: WO2015/182802
PCT Pub. Date: Dec. 3, 2015

(65) Prior Publication Data
US 2016/0148350 A1 May 26, 2016

(30) Foreign Application Priority Data
May 29, 2014 (KR) .................. 10-2014-0065116

(51) Int. Cl.
*G06T 5/00* (2006.01)
*H04N 5/21* (2006.01)
*G06T 7/00* (2006.01)

(52) U.S. Cl.
CPC .............. *G06T 5/002* (2013.01); *G06T 7/0034* (2013.01); *G06T 7/0087* (2013.01); *H04N 5/21* (2013.01);
(Continued)

(58) Field of Classification Search
CPC ............ G06T 5/001; G06T 5/20; G06T 5/004; G06T 7/0012; G06T 7/0083; G06T 2207/30004; G06T 7/0081; G06T 5/50; G06T 2207/30101; G06T 2207/10116; G06T 2207/10081; G06T 11/006; H04N 1/4092; H04N 1/409; G06F 19/321; A61B 6/504; A61B 6/032

See application file for complete search history.

(56) References Cited

U.S. PATENT DOCUMENTS
2005/0248687 A1  11/2005 Lee et al.

FOREIGN PATENT DOCUMENTS
KR  10-2005-0066730 A  6/2005
KR  10-0759517 B1  9/2007
(Continued)

OTHER PUBLICATIONS

Tuan-Anh Nguyen et al., "Adaptive Noise Detection and Removal Algorithm Using Local Statistics and Noise Estimation," J-KICS, Feb. 2013, pp. 183-190, vol. 38 No. 2.
(Continued)

*Primary Examiner* — Duy M Dang
(74) *Attorney, Agent, or Firm* — Novick, Kim & Lee, PLLC; Sang Ho Lee

(57) ABSTRACT

An image processing system includes an a noise detection unit that extracts a local statistical characteristic of a predicted original image according to a local statistical characteristic of an observed image and a local statistical characteristic of a predicted noise image, sets a flag level indicating a distortion state for each of pixels of the observed image according to the local statistical characteristic of the predicted original image, zones the observed image through a filter window, determines distortion states of adjacent pixels, corrects the flag level, and detects noise, and a noise removal unit that adaptively sets a filter size according to the corrected flag level and removes the noise, when the corrected flag level is determined through the noise detection unit, and therefore it is possible to implement adaptive noise detection and removal techniques of a distorted image damaged by noise, and detect a contour to the corresponding pixels into undistorted pixels.

13 Claims, 7 Drawing Sheets

(52) U.S. Cl.
CPC ........... *G06T 2207/20012* (2013.01); *G06T 2207/20024* (2013.01); *G06T 2207/20076* (2013.01)

(56) References Cited

FOREIGN PATENT DOCUMENTS

| KR | 10-2009-0075507 A | 7/2009 |
|----|-------------------|--------|
| KR | 10-2009-0081273 A | 7/2009 |
| KR | 10-0996281 B1 | 11/2010 |
| KR | 10-2011-0005408 A | 1/2011 |

OTHER PUBLICATIONS

Tuan-Anh Nguyen et al., "MRF-based Adaptive Noise Detection Algorithm for Image Restoration," Dept of Information and Telecommunication, Soongsil University, 2013, pp. 5-8, vol. 16 No. 1.

Tuan-Anh Nguyen et al., "Extended MRF-based Adaptive Detection Approach for Restoring Images Degraded by Gaussian Noise," School of Information and Telecommunication Engineering Soongsil University, 2013, pp. 556-560.

Tuan-Anh Nguyen et al., "Image De-noising based on Adaptive Noise Detection Algorithm," School of Information and Telecommunication Engineering Soongsil University, Dec. 2013, pp. 134-138.

Tuan-Anh Nguyen et al., "MRF-based Noisy Pixel Detection and Noise Level Estimation for Image Restoration," Information and Telecommunication Engineering Soongsil University, Feb. 2014.

Patrick Perez, "Markov Random Fields and Images," CWI Quarterly, 1998, pp. 413-437, vol. 11 No. 4.

Tuan-Anh Nguyen et al., "MRF-based Adaptive Noise Detection Algorithm for Image Restoration," Journal of Korea Multimedia Society, Dec. 2013, pp. 1368-1375, vol. 16 No. 12.

(a)

(b)

(c)

(d)

(e)

(f)

IMAGE PROCESSING METHOD, SYSTEM USING THE SAME, AND RECORDING MEDIUM FOR PERFORMING THE SAME

TECHNICAL FIELD

The present invention relates to an image processing method, a system using the same, and a recording medium for performing the same, and more particularly, to an image processing method which may apply space adaptive noise detection and removal techniques to a distorted image, a system using the same, and a recording medium for performing the same.

BACKGROUND ART

A digital image generally includes noise that is added to an original image by an image system, or the like, in an analog signal acquisition process and a subsequent conversion process to digital signals. An image distorted by the added noise may cause a decrease of the compression efficiency due to an increase in the high-frequency components in an image compression process and cause a degradation of recognition efficiency in an image recognition system. The image distortion phenomenon caused by the added noise may cause problems in a variety of image application fields, and therefore it is very important to effectively minimize the added noise in a pre-processing process to maximize the performance of the relevant application system.

Meanwhile, the ultimate goal of the noise removal technique is to generate a restored image close to the original image while preserving detailed information and image boundaries, and thus related various techniques have been proposed. Noise generated during an acquisition process of most image systems has a Gaussian distribution characteristic, and as a representative technique for dealing with this type of noise characteristic, an LMS (least mean square) technique has been used. The LMS technique accompanies an image contour degradation phenomenon in its filtering process. As a representative technique based on a local statistical characteristic, an average filter and a median filter have been used, and a modified form of a weighted local media filter technique or the like has been studied, but there is a limitation to minimizing the degradation phenomenon.

Various methods for assigning a local adaptability to minimize the degradation phenomenon are being studied. Two-way filter techniques in which a local statistical characteristic and a radiometric difference between pixels are utilized in the weighting of the filter have been representatively studied. However, while the two-way filter is effective compared to the existing method for maintaining the contour components of the restored image, when the amount of the added noise is small, there is a limitation to the performance improvement due to the lack of a noise detection process for determining the presence of noise that is actually present.

DISCLOSURE

Technical Problem

The present invention is directed at providing an image processing method that may predict added noise information by utilizing a local statistical characteristic of an observed image and implement a noise detection and removal technique based on the predicted information, a system using the same, and a recording medium for performing the same.

Technical Solution

One aspect of the present invention provides an image processing system including: extracting a local statistical characteristic of a predicted original image according to a local statistical characteristic of an observed image and a local statistical characteristic of a predicted noise image through a noise detection unit, setting a flag level indicating a distortion state for each pixel of the observed image according to the local statistical characteristic of the predicted original image, zoning the observed image through a filter window, determining distortion states of adjacent pixels, correcting the flag level, and detecting noise. Also, the present invention adaptively sets a filter size according to the corrected flag level and removes the noise by way of a noise removal unit when the corrected flag level is determined through the noise detection unit.

The noise detection unit may include an observed image local statistical extraction unit that extracts the local statistical characteristic of the observed image by extracting a local mean value of the observed image and a local standard deviation thereof.

The noise detection unit may further include a low-frequency filter design unit that designs a filter coefficient for each position of the pixels within a filter window using the local mean value and local standard deviation of the observed image, a normalization constant, and a correction parameter.

The noise detection unit may further include a predicted noise image generation unit that generates the predicted noise image by calculating the observed image and the filter coefficient designed by the low-frequency filter design unit.

The noise detection unit may include a noise classification unit that sets a flag level for each pixel of the observed image according to a local mean value of the predicted original image and a pixel value of the observed image.

The noise detection unit may include a noise correction unit that zones the observed image using a Markov random field model, determines adjacent pixels within the zoned Markov random field that are consecutively distorted to be pixels of a contour, and corrects the corresponding pixels into undistorted pixels.

When three or more adjacent pixels within the Markov random field are consecutively distorted in a straight line direction or a curved line direction, the noise correction unit may determine the corresponding pixels to be a contour, and correct the corresponding pixels into undistorted pixels.

Another aspect of the present invention provides an image processing method including: extracting a local statistical characteristic of an observed image, generating a predicted image by generating a low-pass filter according to the local statistical characteristic, extracting a local statistical characteristic of the predicted noise image, extracting a local statistical characteristic of a predicted original image using the local statistical characteristic of the observed image and the local statistical characteristic of the predicted noise image, and detecting noise by setting a flag level indicating a noise level for each of pixels of the observed image according to the local statistical characteristic of the predicted original image; correcting the flag level by zoning the observed image into a Markov random field, and determining consecutive distortion states of adjacent pixels within the Markov random field; and removing noise by adaptively setting a filter coefficient according to the corrected flag level, and restoring an original image.

The extracting of the local statistical characteristic of the observed image may include extracting a local mean value of the observed image and a local standard deviation thereof.

The zoning of the observed image into the Markov random field and the determining of the consecutive distortion states of adjacent pixels within the Markov random field to correct the flag level may include determining that a contour line is present when three or more pixels are determined to be consecutively distorted to correct the corresponding pixels into undistorted pixels.

A recording medium according to an embodiment of the present invention may store a computer-readable program for performing an image processing method according to the method described above.

Advantageous Effects

According to the one aspect of the present invention described above, an adaptive noise detection and removal technique may be implemented for an image corrupted and distorted by noise and by detecting a contour line the distorted image may be corrected into a distortion-free image.

MODES OF THE INVENTION

Figure 1:
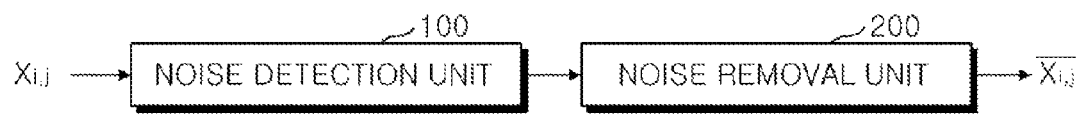
FIG. 1 is a control block diagram of an image processing system according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the present invention. Also, it is to be understood that the positions or arrangements of individual elements in the embodiment may be changed without separating the spirit and scope of the present invention. The following detailed description is, therefore, not to be taken in a limiting sense, and the scope of the present invention is defined only by the appended claims that should be appropriately interpreted along with the full range of equivalents to which the claims are entitled. In the drawings, like reference numerals identify like or similar elements or functions through the several views.

Hereinafter, preferred embodiments of the present invention will be described in more detail with reference to the accompanying drawings.

FIG. 1 is a control block diagram of an image processing system according to an embodiment of the present invention.

The image processing system may include a noise detection unit 100 and a noise removal unit 200.

The noise detection unit 100 may detect noise of an observed image. The noise detection unit 100 may extract a local statistical characteristic of the observed image, and generate a predicted noise image using the extracted local statistical characteristic. The noise detection unit 100 may extract a local statistical characteristic of the predicted noise image, and extract a local statistical characteristic of a predicted original image using the local statistical characteristic of the observed image and the local statistical characteristic of the predicted noise image. The noise detection unit 100 may compare the local statistical characteristic of the predicted original image to a pixel value of the observed image and thereby designate a flag level indicating a level of noise for each pixel. The noise detection unit 100 may zone the corresponding screen into a Markov random field model, and when adjacent values within the zoned Markov random field are also distorted pixels, the corresponding pixels may be determined to be pixels of a contour line and thereby be corrected into undistorted pixels.

When the flag level determined by the above-described process is high, a size of a noise filter for image restoration is increased, and when the flag level is low, the size of the noise filter for image restoration is reduced. When the flag level is '0', the noise filter is not applied and the corresponding pixel of the observed image may be directly applied as a pixel of the predicted original image.

The noise removal unit 200 may adaptively set a filter size depending on the classification by the noise detection unit 100 of the observed image into the flag levels to remove the noise and restore the original image. The noise removal unit 200 may increase the applied filter size when the noise level of the observed image that is, when the flag level is high and reduce the filter size or directly use the corresponding pixel in the image restoration without applying the filter when the flag level is low.

Figure 2:
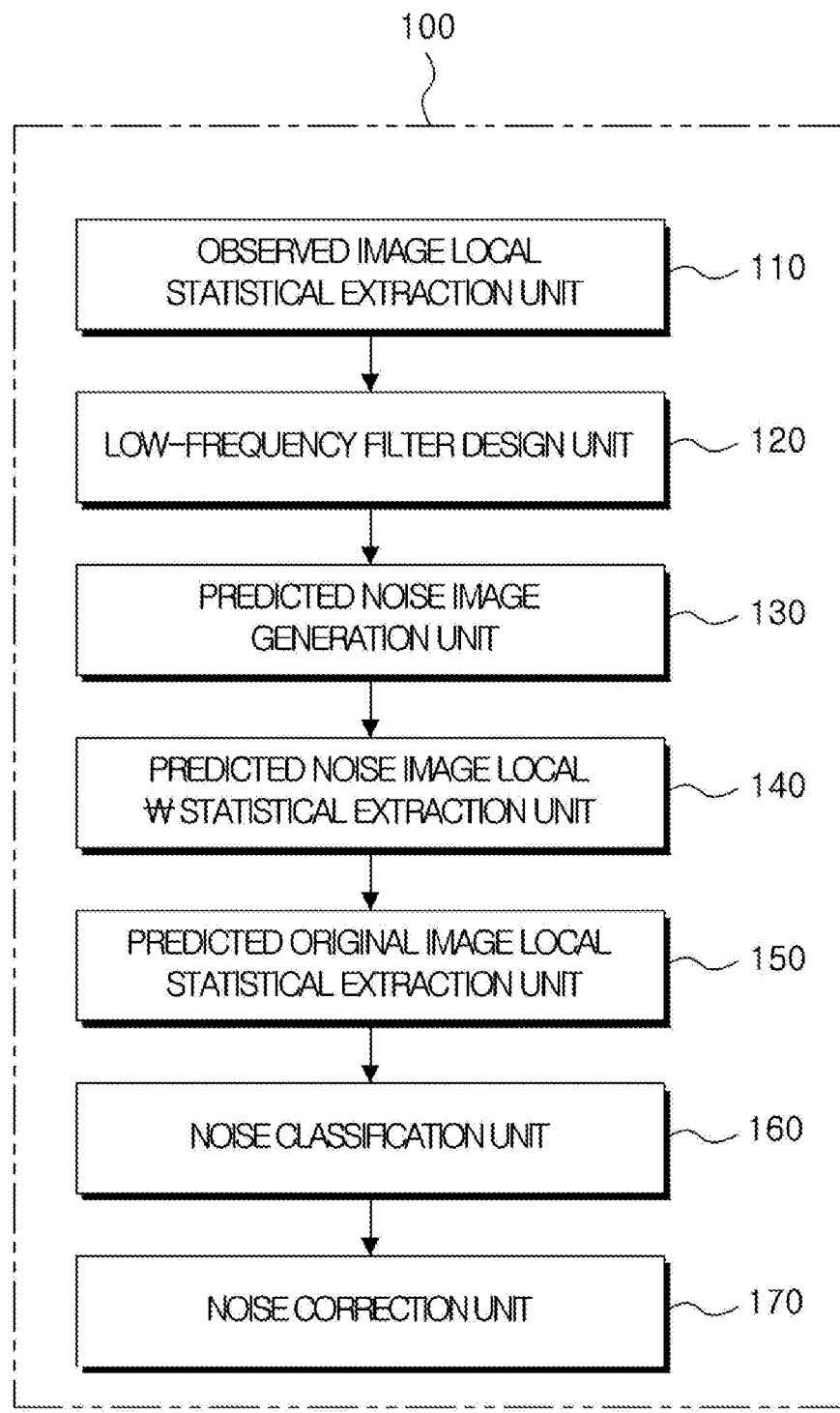
FIG. 2 is a detailed block diagram of a noise detection unit included in an image processing system according to an embodiment of the present invention.
Figure 3:
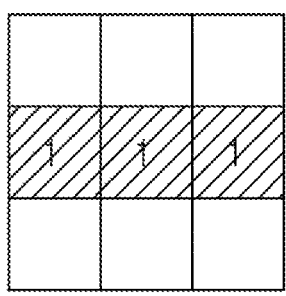
FIG. 3 is a diagram illustrating an example of a Markov random field provided in order to describe the operation of a noise correction unit included in an image processing system according to an embodiment of the present invention.
Figure 3:
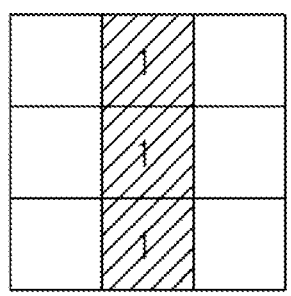
Figure 3:
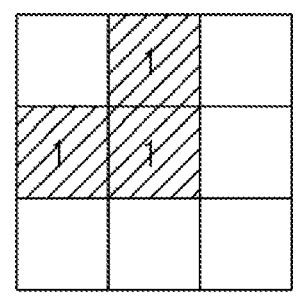
Figure 3:
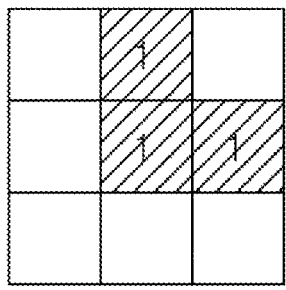
Figure 3:
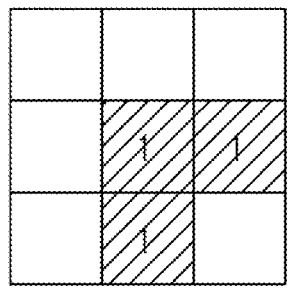
Figure 3:
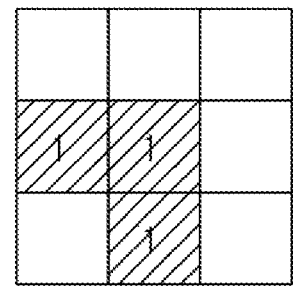

FIG. 2 is a detailed block diagram of a noise detection unit included in an image processing system according to an embodiment of the present invention, and FIG. 3 is a diagram illustrating an example of a Markov random field provided in order to describe the operation of a noise correction unit included in an image processing system according to an embodiment of the present invention.

The noise detection unit 100 may include an observed image local statistical extraction unit 110, a low-frequency filter design unit 120, a predicted noise image generation unit 130, a predicted noise image local statistical extraction unit 140, a predicted original image local statistical extraction unit 150, a noise classification unit 160, and a noise correction unit 170.

The observed image local statistical extraction unit 110 may detect a local statistical characteristic of an input image. The local statistical characteristic may include a local mean value and a local standard deviation. The characteristic of the noise may become visually enhanced due to an increase in the local mean value, and diminished due to an increase in the local standard deviation. A local statistical characteristic set in a window size (2K+1)×(2K+1) of an (i,j)-th pixel of an input image f may be shown by the following Equations 1 and 2.

$$\mu_K^f(i, j) = \frac{\sum_{m=-K}^{K}\sum_{m=-K}^{K} \omega(m, n) f(i+m, j+n)}{\sum_{m=-K}^{K}\sum_{m=-K}^{K} \omega(m, n)},$$ [Equation 1]

$$\sigma_K^f(i, j) = \frac{\sum_{m=-K}^{K}\sum_{m=-K}^{K} \omega(m, n) |f(i+m, j+n) - \mu_K^f(i, j)|}{\sum_{m=-K}^{K}\sum_{m=-K}^{K} \omega(m, n)}.$$ [Equation 2]

In Equations 1 and 2, $\mu_K^f(i,j)$ denotes a local mean value of the image f, w(m,n) denotes a weight assigned to pixels within the window, and $\sigma_K^f(i,j)$ denotes a local standard deviation.

The low-frequency filter design unit 120 may design a low-pass Gaussian filter which has been corrected for the (i, j)-th pixel using the local mean value and local standard deviation extracted by the observed image local statistical extraction unit 110. The low-pass Gaussian filter designed by the low-frequency filter design unit 120 may be represented and applied by the following Equation 3.

$$h(i+m, j+n) = \frac{1}{Z_1} \exp\left(-L_1 \frac{(\sigma_K^y(i, j))^2 (m^2 + n^2)}{\sqrt{\mu_K^f(i, j) + 1}}\right)$$ [Equation 3]

In Equation 3, h(i+m,j+m) denotes a low-pass Gaussian filter, Z1 denotes a normalization constant, L1 denotes a correction parameter, and m and n denote the position of a pixel within a filter window.

The predicted noise image generation unit 130 may generate a predicted noise image using the low-pass Gaussian filter designed by the low-frequency filter design unit 120. The predicted noise image generation unit 130 may be represented by the following Equation 4.

$$\hat{n} = y - \hat{x} = y - y * h$$ [Equation 4]

In Equation 4, $\hat{n}$ denotes a predicted noise image, $\hat{x}$ denotes a predicted original image, y denotes an observed image, and * denotes a convolution operator.

The predicted noise image local statistical extraction unit 140 may extract a local statistical characteristic of the predicted noise image generated by the predicted noise image generation unit 130. The local statistical characteristic may include a local mean value of the predicted noise image and a local standard deviation thereof.

The predicted original image local statistical extraction unit 150 may extract a local statistical characteristic of the predicted original image using the predicted noise image generated by the predicted noise image generation unit 130. The predicted original image local statistical extraction unit 150 may extract the local statistical characteristic of the predicted original image using the local statistical characteristic of the predicted noise image and the local statistical characteristic of the observed image. As described above, the local statistical characteristic may include the local mean value and the local standard deviation. The local statistical characteristic of the predicted original image may be represented by the following Equations 5 and 6.

$$\mu_K^{\hat{x}}(i, j) = \mu_K^y(i, j) - \mu_K^{\hat{n}}(i, j)$$ [Equation 5]
$$= \mu_K^{\hat{y}}(i, j)$$

$$\sigma_K^{\hat{x}}(i, j) = \sqrt{(\sigma_K^y(i, j))^2 - (\sigma_K^{\hat{n}}(i, j))^2}$$ [Equation 6]

Equations 5 and 6 indicate local statistical characteristic information of the predicted original image. $\mu_K^{\hat{x}}(i,j)$ denotes a local mean value of the predicted original image, and $\sigma_K^{\hat{x}}(i,j)$ denotes a local standard deviation of the predicted original image. Referring to Equation 5, a difference value between a local mean value of the observed image and a local means value of the predicted noise image becomes the local mean value of the predicted original image. Referring to Equation 6, a value corresponding to the root of a difference between a value corresponding to the square of a local standard deviation of the observed image and a value corresponding to the square of a local standard deviation of the predicted original image may become the local standard deviation of the predicted original image.

Meanwhile, as to the local statistical characteristic of the predicted original image in terms of an (i, j)-th pixel of the observed image, the pixel with a large error between the pixel and the local mean value $\mu_K^{\hat{x}}(i,j)$ of the predicted original image may be classified into a pixel with large noise, and when the pixel is within a predetermined range of the corresponding local mean value, it can be determined to be a pixel with small noise or free of noise.

The noise classification unit 160 may perform a noise classification process according to the (i, j)-th pixel value of the observed image based on the above description.

$$D_{i,j}^y = \begin{cases} 2, & \text{if } y(i, j) \le \mu_K^{\hat{x}}(i, j) - T_2 \text{ or } y(i, j) \ge \mu_K^{\hat{x}}(i, j) + T_2 \\ 1, & \text{if } \mu_K^{\hat{x}}(i, j) - T_2 < y(i, j) \le \mu_K^{\hat{x}}(i, j) - T_1 \text{ or} \\ & \mu_K^{\hat{x}}(i, j) + T_1 < y(i, j) \le \mu_K^{\hat{x}}(i, j) + T_2 \\ 0, & \text{otherwise} \end{cases}$$ [Equation 7]

In Equation 7, $T_1$ (a first threshold value) and $T_2$ (a second threshold value) denote threshold values, and $D_{i,j}^y$ denotes a flag level. In Equation 7, when a difference between the local mean value of the predicted original image and a pixel value of the observed image is smaller than the predetermined $T_1$ (the first threshold value), the flag level is set as a low level '0', when the difference between the local mean value of the predicted original image and the pixel value of the observed image is larger than the predetermined $T_1$ (the first threshold value) and smaller than the predetermined $T_2$ (the second threshold value), the flag level is set as a middle level. When the difference between the local mean value of the predicted original image and the pixel value of the observed image is larger than the predetermined $T_2$ (the second threshold value), the flag level is set as a high level. Next, when the flag level is '2', it may be determined to be the high level, when the flag level is '1', it may be determined to be the middle level, and when the flag level is '0', it may be determined to be the low level.

As shown in Equation 7, when a threshold value defined in advance is used in a classification process according to the noise, a change in the noise classification performance may occur depending on the local characteristic of the image or the amount of noise, leading to a large problem. In order to solve this, according to an aspect of the present invention, assuming that the predicted original image x̂ and the observed image y have Gaussian distribution, threshold values may be set according to the local statistical characteristic as shown in Equation 8.

$$\begin{cases} T_2 = \dfrac{1}{\left(\sigma_K^{\hat{x}}(i,\ j)\right)^3 \sqrt{2\pi}} \\ T_1 = \dfrac{T_2}{4} \end{cases} \quad \text{[Equation 8]}$$

By setting the threshold values $T_1$ and $T_2$ of Equation 7 by the equations shown in Equation 8, it is possible, using local activity, to assign a self-control capability in the noise classification process according to the image characteristic.

The noise correction unit 170 may correct the noise through a noise classification process based on a Markov random field and using the continuity characteristic of the contour in order to solve a problem in which, while a noise detection process by the above-described noise classification unit 160 is very effective in a region with no abrupt changes between pixels, an important region such as a contour or the like is degraded due to being determined to be noise by a noise removal process.

The Markov random field is a field of the probability theory for a spatial analysis or a before and after analysis of a physical phenomenon that may provide a method of incorporating a variety of spatial information. According to an aspect of the present invention, an image zoning technique based on a Markov random field model that is a kind of a probabilistic model may be applied to pixels of an image, a contour line of an object may be detected by a consideration of the inter pixel relationship within a space, and the detected contour line may be corrected into undistorted pixels. Meanwhile, a specific method of zoning the image by the Markov random field has been described in detail in "Patrick Perez. Markov Random Fields and Images CWI Quarterly 11(4)413-437, 1998".

When adjacent values of a noise detection value $D_{i,j}^y$ detected by the noise classification unit 160 within the Markov random field are determined to have noise components, the noise correction unit 170 may classify the noise components as contour information having continuity within the screen, and correct the corresponding pixels into undistorted pixels.

The noise correction unit 170 may zone the corresponding image into the Markov random fields, and when the adjacent values within a zoned Markov random field are also distorted pixels, the noise correction unit 170 may determine the pixels to be pixels of a contour line. Here a case in which the adjacent values are also distorted pixels includes a case in which three or more pixels are determined to be consecutively distorted, and includes cases in which the pixels are consecutively distorted in a curved line as well as in a straight line for which the pixels may be determined to be the consecutively distorted pixels.

A method in which a screen is zoned into the Markov random fields and a noise determination state of adjacent values is determined for identifying a contour line will be more specifically described with reference to FIG. 3.

Referring to FIG. 3, the classification into pixels having large noise (flag level '1' or '2') and pixels having small noise (flag level '0') among a plurality of pixels in a field (or a field zoned by the Markov random field) filtered by a filter window may be determined by the noise classification unit 160. In this case, as shown in (a) to (f) of FIG. 3, when adjacent pixel values positioned within the field filtered by the filter window are determined contain noise characteristics, the corresponding pixels may be identified as pixels of a continuous contour line for being corrected into undistorted pixels. This method is a noise correction detection technique using the Markov random field which may be represented by the following Equation 9.

$$Flag_{i,j}^y = \begin{cases} 0 \text{ if } D_{i,j}^y \neq 0 \text{ and } D_{i,j-1}^y \neq 0 \text{ and } D_{i,j+1}^y \neq 0 \\ 0 \text{ if } D_{i,j}^y \neq 0 \text{ and } D_{i-1,j}^y \neq 0 \text{ and } D_{i+1,j}^y \neq 0 \\ 0 \text{ if } D_{i,j}^y \neq 0 \text{ and } D_{i,j-1}^y \neq 0 \text{ and } D_{i-1,j}^y \neq 0 \\ 0 \text{ if } D_{i,j}^y \neq 0 \text{ and } D_{i,j-1}^y \neq 0 \text{ and } D_{i+1,j}^y \neq 0 \\ 0 \text{ if } D_{i,j}^y \neq 0 \text{ and } D_{i-1,j}^y \neq 0 \text{ and } D_{i,j+1}^y \neq 0 \\ 0 \text{ if } D_{i,j}^y \neq 0 \text{ and } D_{i+1,j}^y \neq 0 \text{ and } D_{i,j+1}^y \neq 0 \\ D_{i,j}^y \text{ otherwise} \end{cases} \quad \text{[Equation 9]}$$

The noise detection characteristic of Equation 9 is as follows. A pixel y(i,j) in which $Flag_{i,j}^y$ is determined to be '2' indicates a case in which the distortion is severe due to isolated noise, a pixel determined to be '1' indicates a case in which the distortion is weak, and a pixel determined to be '0' indicates a case in which the noise component is absent or the pixel belongs to a continuous contour.

In FIG. 3, (a) to (f) indicate distorted states of pixels exhibited when a contour region is present in the image, (a) and (b) indicate distorted states of pixels belonging to a straight line contour, and (c) to (f) indicate distorted states of pixels belonging to a curved line.

Figure 4:
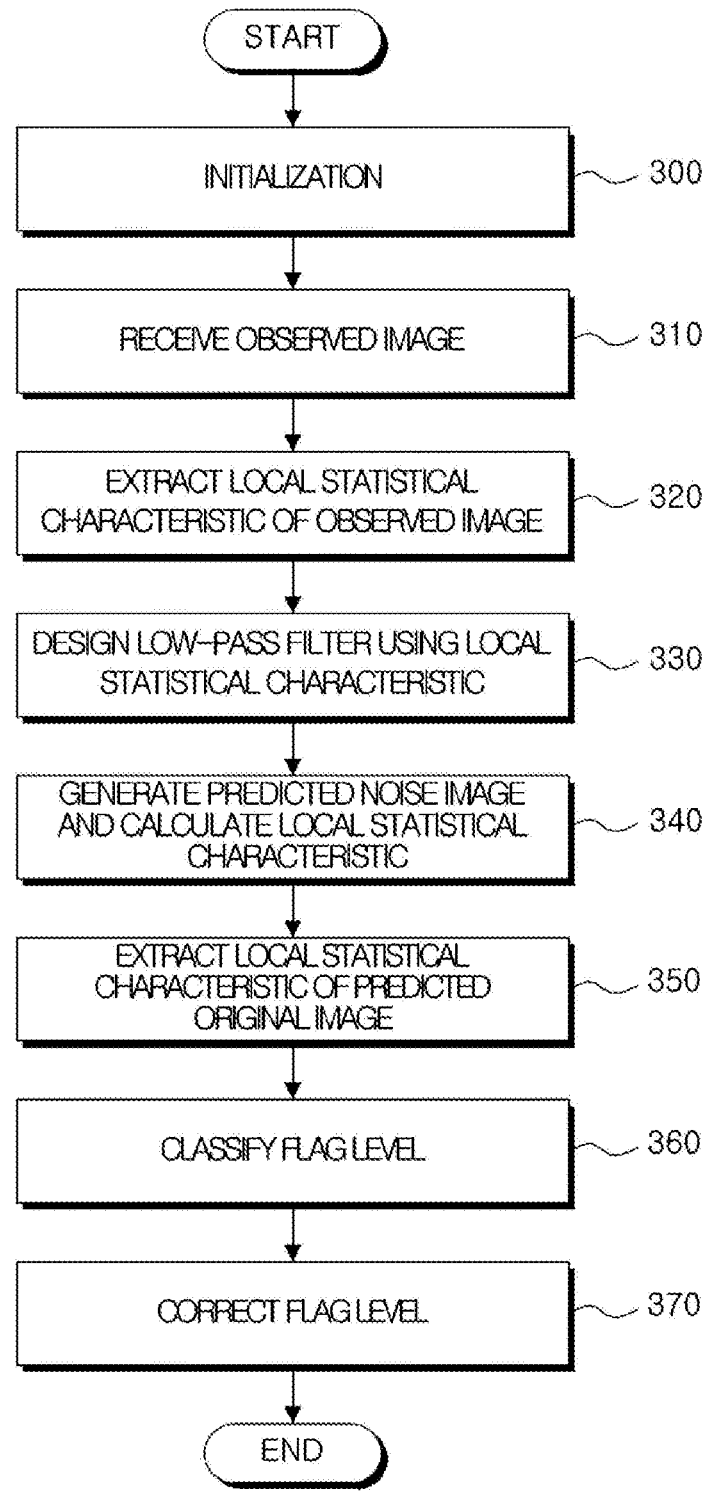
FIG. 4 is a control flowchart of a noise detection unit included in an image processing system according to an embodiment of the present invention.

FIG. 4 is a control flowchart of a noise detection unit included in an image processing system according to an embodiment of the present invention.

In operation 300, the noise detection unit 100 may initialize each of a noise value for an input image and an index of a block image into a predetermined initial value.

In operations 310 and 320, the observed image local statistical extraction unit 110 may receive an image f, and detect a local statistical characteristic of the input image. The local statistical characteristic may include a local mean value and a local standard deviation, as described above.

In operation 330, the low-frequency filter design unit 120 may design a low-pass Gaussian filter using the local mean value and the local standard deviation which have been extracted by the observed image local statistical extraction unit 110.

In operation 340, the predicted noise image generation unit 130 may generate a predicted noise image using the low-pass Gaussian filter which has been designed by the low-frequency filter design unit 120, and the predicted noise image local statistical extraction unit 140 may extract a local statistical characteristic of the predicted noise image generated by the predicted noise image generation unit 130.

In operation 350, the predicted original image local statistical extraction unit 150 may extract a local statistical characteristic of the predicted original image using the local statistical characteristic of the predicted noise image having been generated by the predicted noise image generation unit 130 and a local statistical characteristic of the observed image having been generated by the observed image local statistical extraction unit 110.

In operation 360, the noise classification unit 160 may classify a flag level for each pixel by comparing the local mean value of the predicted original image and a value of an (i,j)-th pixel of the observed image. Specifically, the noise classification unit 160 may classify the flag level into a high level '2' when a difference between the local mean value of the predicted original image and the pixel value of the observed image is large, classify the flag level into a middle level '1' when the difference is a medium value, and classify the flag level into a low level or a zero level '0' when there is almost no difference there between.

In operation 370, the noise correction unit 170 may correct the classification state obtained by the noise classification unit 160 through a noise classification process based on the Markov random field, using the continuity characteristic of a contour region. Specifically, when a plurality of pixels included in a region filtered by the window filter exhibit a predetermined distortion pattern, the noise correction unit 170 may determine that the pixels are in the distorted state due to a contour and correct into undistorted pixels.

Figure 5:
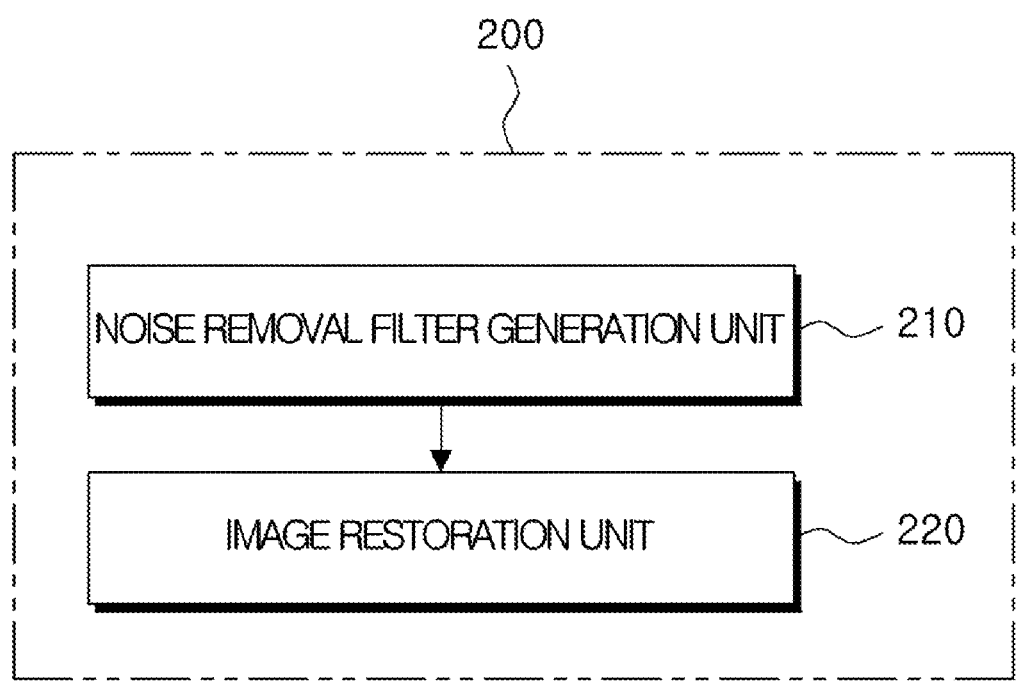
FIG. 5 is a detailed block diagram of a noise removal unit included in an image processing system according to an embodiment of the present invention.

FIG. 5 is a detailed block diagram of a noise removal unit included in an image processing system according to an embodiment of the present invention.

The noise removal unit 200 may include a noise removal filter generation unit 210 and an image restoration unit 220.

The noise removal filter generation unit 210 may adaptively change a parameter and a filter window size according to $\text{Flag}_{i,j}^y$ which has been identified by the noise classification unit 160 and the noise correction unit 170 to exhibit a predicted noise characteristic. The noise removal filter generation unit 210 may generate a filter coefficient as shown in Equation 10.

$$g_U(i+m, j+n) = \quad \text{[Equation 10]}$$

$$\frac{1}{Z_2}\exp\left(-L_2 \frac{\left(\sigma_K^{\hat{x}}(i,j)\right)^2(m^2+n^2)}{\sqrt{\mu_K^{\hat{x}}(i,j)+1}}\right) \text{ for } -U \leq m, n \leq U$$

In Equation 10, U denotes a size of a filter window, and each of Z2 and L2 denotes a filter constant. The size of the filter window according to an amount of noise in Equation 10 may be set as shown in Equation 11. Meanwhile, the filter of Equation 10 may avoid degrading the original image because the filter coefficient value of an adjacent pixel is set smaller with increasing local distribution and the filter is set larger with increasing amount of noise for applying a strong low-pass filter.

$$U = \begin{cases} 2, & \text{for } \text{Flag}_{i,j}^y = 2 \\ 1, & \text{for } \text{Flag}_{i,j}^y = 1 \end{cases} \quad \text{[Equation 11]}$$

When U=2 is satisfied, the size of the filter window may be set as 5*5, and when U=1 is satisfied, the size of the filter window may be set as 3*3. Here the size of the filter window may vary depending on a design.

The image restoration unit 220 may restore the original image using the filter coefficient generated by the noise removal filter generation unit 210. The restored image may be represented by Equation 12.

$$\hat{x}(i,j) = \quad \text{[Equation 12]}$$

$$\begin{cases} y(i,j), & \text{for } D_{i,j}^y = 0 \\ \dfrac{\sum_{m=-U}^{U}\sum_{n=-U}^{U} y(i+m, j+n)g_U(m,n)}{\sum_{m=-U}^{U}\sum_{n=-U}^{U} g_U(m,n)}, & \text{otherwise} \end{cases}$$

The image restoration unit 220 may determine that the pixel is a pixel in which there is no noise component when $D_{i,j}^y$ is '0', so that the image restoration unit 220 may immediately replace an observed signal with a restored signal without performing the noise filter. When $D_{i,j}^y$ is 1 or 2, the image restoration unit 220 may restore the original image by performing the noise removal filter and convolution as shown in the Equation 12.

Figure 6A:
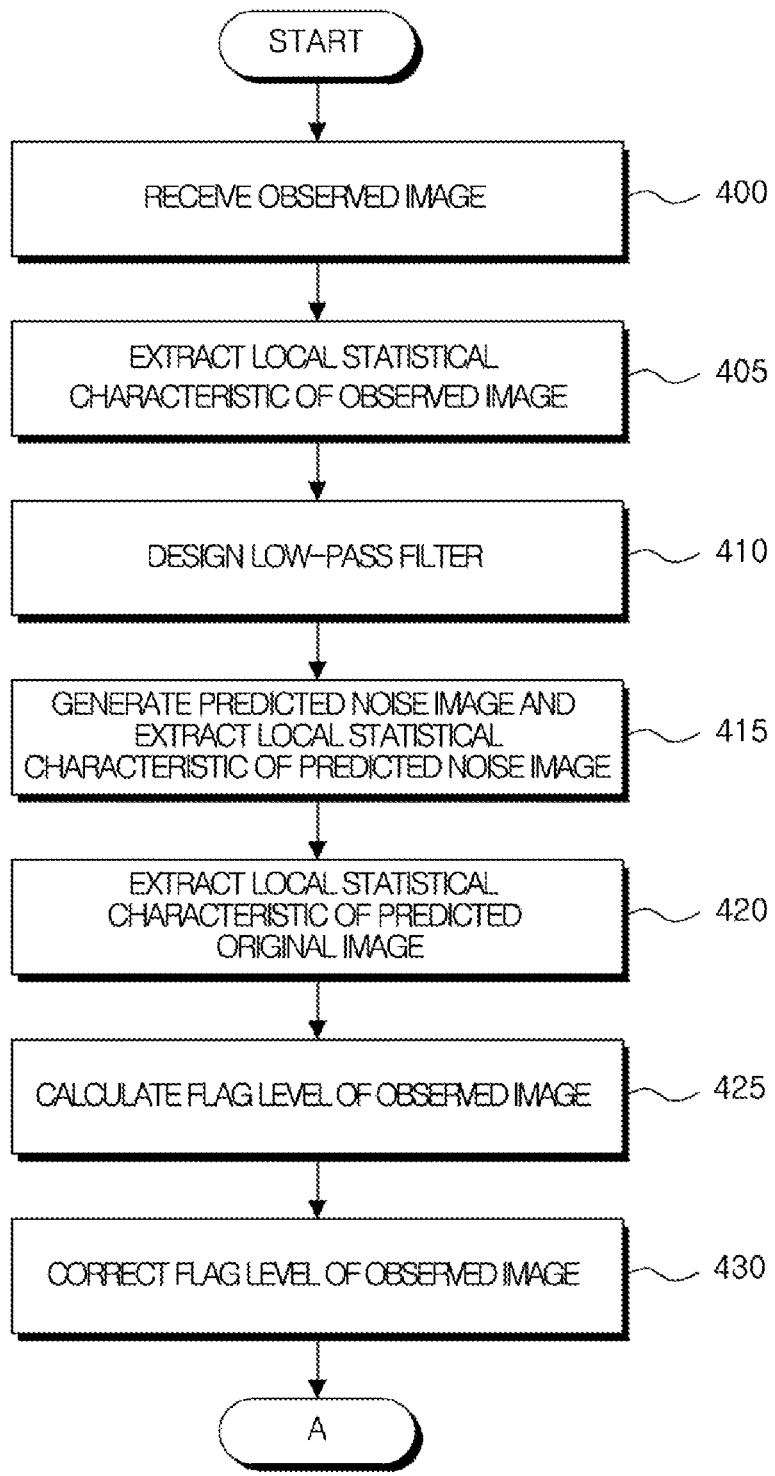
FIGS. 6a and 6b are control flowcharts of an image processing system according to an embodiment of the present invention.
Figure 6B:
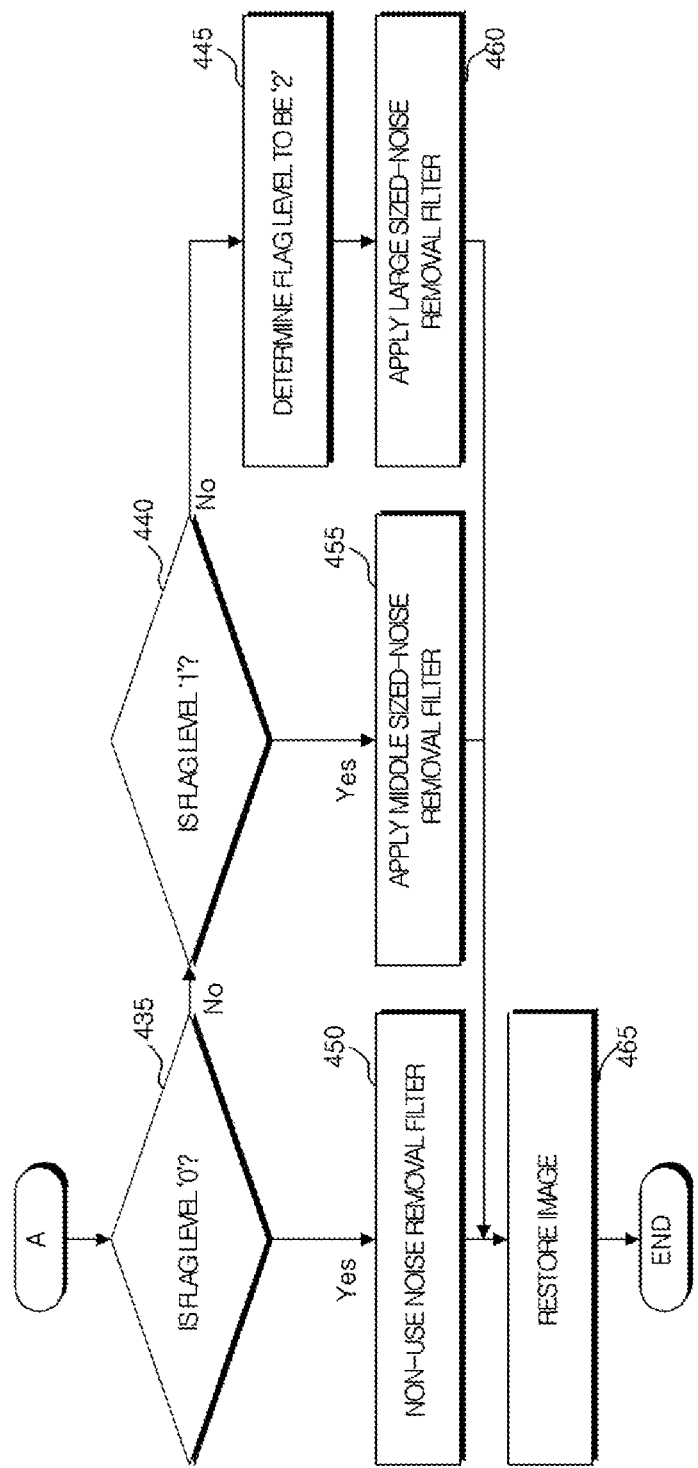

FIGS. 6a and 6b are control flowcharts of an image processing system according to an embodiment of the present invention.

In operation 400, the observed image local statistical extraction unit 110 may receive an observed image to which noise has been added. In operation 405, the observed image local statistical extraction unit 110 may detect a local statistical characteristic of the observed image. The local statistical characteristic of the observed image may include a local mean characteristic of the noise bearing original image and a local standard deviation characteristic thereof.

In operation 410, the low-frequency filter design unit 120 may design a low-pass Gaussian filter adjusted for an (i, j)-th pixel using the local mean value and local standard deviation extracted by the observed image local statistical extraction unit 110.

In operation 415, the predicted noise image generation unit 130 may generate a predicted noise image using the low-pass Gaussian filter designed by the low-frequency filter design unit 120, and the predicted noise image local statistical extraction unit 140 may extract a local statistical characteristic of the predicted noise image generated by the predicted noise image generation unit 130. The local statistical characteristic may include a local mean value of the predicted noise image and a local standard deviation thereof.

In operation 420, the predicted original image local statistical extraction unit 150 may extract a local statistical characteristic of the predicted original image using the predicted noise image generated by the predicted noise image generation unit 130. Specifically, the predicted original image local statistical extraction unit 150 may extract the local statistical characteristic of the predicted original image using the local statistical characteristic of the predicted noise image and the local statistical characteristic of the observed image.

The noise classification unit 160 may perform a noise classification process according to an (i, j)-th pixel value of the observed image. In operation 425, the noise classification unit 160 may calculate a flag level according to a pixel value of the observed image. The flag level indicates a noise level calculated by comparing the pixel value of the observed image and the local mean value of the predicted original image. Examples of the flag level may be 0, 1, and 2, and other criteria may be applied. Here, the corresponding embodiments will be described assuming that the flag levels are 0, 1, and 2.

In operation 430, the noise correction unit 170 may correct and classify the flag level classified by the noise classification unit 160. When three or more plurality of adjacent pixel values within a screen zoned into the Markov random field are determined to be in the distorted state, the noise correction unit 170 may determine the corresponding pixels to be a contour and correct the corresponding pixel into an undistorted pixel.

The noise removal filter generation unit 210 may adaptively change a parameter and a filter window size according to $\text{Flag}_{i,j}^y$ which has been classified by the noise classification unit 160 and the noise correction unit 170 as exhibiting a predicted noise characteristic. In operations 435 and 450, the noise removal filter generation unit 210 may not generate a noise removal filter for a pixel whose flag level is '0' because the noise removal filter generation unit 210 lets such a pixel with a flag level '0' pass without using the noise removal filter and uses the pixel in the restoration of the original image as is.

In operations 440, 445, 455, and 460, when the flag level is '1' or '2', the noise removal filter generation unit 210 sets the size of the noise removal filter differently for use in the restoration of the original image. The noise removal filter generation unit 210 may generate a noise filter having a size of 3×3 when the flag level is '1' and generate a noise filter having a size of 5×5 when the flag level is '2'.

The image restoration unit 220 may restore the original image by applying the filter generated by the noise removal filter generation unit 210 for each pixel of the observed image. As described above, the image restoration unit 220 may determine that a pixel has no noise component when the flag level is '0', and the image restoration unit 220 may immediately replace the observed signal with the restored signal without performing the noise filtering. When the flag level is 1 or 2, the image restoration unit 220 may restore the original image using the noise removal filter whose size is different for each of the corresponding flag levels.

Meanwhile, technology for restoring an image using the Markov random field may be implemented as an application or implemented in the form of program instructions that may be executed in various computer components and recorded on a computer-readable recording medium. The computer-readable recording medium may include program instructions, data files, data structures, and the like either individually or in a combination.

The program instructions recorded on the medium may be specifically designed and constructed for the present invention and may be made publicly available to and useable by those having ordinary skill in the art of the computer software.

Examples of the computer-readable recording medium include a magnetic medium such as a hard disk, a floppy disk, a magnetic tape, an optical recording medium such as a compact disc-read only memory (CD-ROM) or a digital video disc (DVD), a magneto-optical medium such as a floptical disk, a hardware device such as ROM, a random access memory (RAM), or a flash memory that is specially designed to store and execute program instructions.

Examples of the program instructions include not only machine code generated by a compiler or the like but also high-level language codes that may be executed by a computer using an interpreter or the like. The hardware device described above may be constructed so as to operate as one or more software modules for performing the operations of the embodiments of the present invention, and vice versa.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An image processing system comprising:
   a noise detection unit extracting a local statistical characteristic of a predicted original image according to a local statistical characteristic of an observed image and a local statistical characteristic of a predicted noise image, setting a first flag level indicating a distortion state for each of pixels of the observed image according to the local statistical characteristic of the predicted original image, segmenting the observed image through a filter window, and detecting a noise by correcting the first flag level to a second flag level based on distortion states of adjacent pixels; and
   a noise removal unit removing the noise by adaptively setting a filter size according to the second flag level, when the second flag level is determined through the noise detection unit.

2. The image processing system according to claim 1, wherein the noise detection unit comprises an observed image local statistical extraction unit extracting the local statistical characteristic of the observed image by extracting a local average value of the observed image and a local standard deviation thereof.

3. The image processing system according to claim 2, wherein the noise detection unit further comprises a low-frequency filter design unit generating a filter coefficient for each position of the pixels within the filter window using a normalization constant, a correction parameter, and the local average value and the local standard deviation of the observed image.

4. The image processing system according to claim 3, wherein the noise detection unit further comprises a predicted noise image generation unit generating the predicted noise image by calculating the observed image and the filter coefficient generated by the low-frequency filter design unit.

5. The image processing system according to claim 1, wherein the noise detection unit comprises a noise classification unit setting the first flag level for each of the pixels of the observed image according to a local average value of the predicted original image and a pixel value of the observed image.

6. The image processing system according to claim 1, wherein the noise detection unit comprises a noise correction unit segmenting the observed image using a Markov random field model, and correcting adjacent pixels into undistorted pixels when the adjacent pixels are within a Markov random field and are consecutively distorted, which is determined to be a contour line.

7. The image processing system according to claim 6, wherein, if at least three adjacent pixels within the Markov random field are consecutively distorted in a straight line direction or in a curved line direction, the noise correction unit determines the at least three adjacent pixels to be the contour line, and corrects the at least three adjacent pixels into undistorted pixels.

8. An image processing method comprising:
   extracting a local statistical characteristic of an observed image;
   generating a predicted noise image by generating a low-pass filter according to the local statistical characteristic of the observed image;
   extracting a local statistical characteristic of the predicted noise image;

extracting a local statistical characteristic of a predicted original image using the local statistical characteristic of the observed image and the local statistical characteristic of the predicted noise image;

detecting a noise by setting a first flag level indicating a noise level for each of pixels of the observed image according to the local statistical characteristic of the predicted original image;

correcting the first flag level to a second flag level by segmenting the observed image using a Markov random field model;

determining consecutive distortion states of adjacent pixels within a Markov random field;

removing the noise by adaptively setting a filter coefficient according to the second flag level; and restoring an original image.

9. The image processing method according to claim 8, wherein a step of the extracting the local statistical characteristic of the observed image further comprises extracting a local average value of the observed image and a local standard deviation thereof.

10. The image processing method according to claim 8, wherein steps of the correcting the first flag level and the determining consecutive distortion states further comprise determining whether a contour line is present when at least three pixels are consecutively distorted, and correcting the at least three pixels into undistorted pixels.

11. A non-transitory computer-readable recording medium performing an image processing method, the image processing method comprising:

extracting a local statistical characteristic of an observed image;

generating a predicted noise image by generating a low-pass filter according to the local statistical characteristic of the observed image;

extracting a local statistical characteristic of the predicted noise image;

extracting a local statistical characteristic of a predicted original image using the local statistical characteristic of the observed image and the local statistical characteristic of the predicted noise image;

detecting a noise by setting a first flag level indicating a noise level for each of pixels of the observed image according to the local statistical characteristic of the predicted original image;

correcting the first flag level to a second flag level by segmenting the observed image using a Markov random field model;

determining consecutive distortion states of adjacent pixels within a Markov random field;

removing the noise by adaptively setting a filter coefficient according to the second flag level; and restoring an original image.

12. The non-transitory computer-readable recording medium performing the image processing method of claim 11, wherein a step of the extracting the local statistical characteristic of the observed image further comprises extracting a local average value of the observed image and a local standard deviation thereof.

13. The non-transitory computer-readable recording medium performing the image processing method of claim 11, wherein steps of the correcting the first flag level and the determining consecutive distortion states further comprise determining whether a contour line is present when at least three pixels are consecutively distorted, and correcting the at least three pixels into undistorted pixels.

* * * * *